(12) United States Patent
Myung

(10) Patent No.: US 9,729,842 B2
(45) Date of Patent: Aug. 8, 2017

(54) IMAGE STORAGE APPARATUS, IMAGE REPRODUCING APPARATUS, MEHOD OF STORING IMAGE, METHOD OF REPRODUCING AN IMAGE, RECORDING MEDIUM AND PHOTOGRAPHING APPARATUS

(71) Applicant: SAMSUNG ELECTRONICS CO., LTD., Suwon-si, Gyeonggi-do (KR)

(72) Inventor: Jin-su Myung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/755,863

(22) Filed: Jun. 30, 2015

(65) Prior Publication Data

US 2015/0304622 A1  Oct. 22, 2015

Related U.S. Application Data

(63) Continuation of application No. 13/218,001, filed on Aug. 25, 2011.

(30) Foreign Application Priority Data

Aug. 26, 2010  (KR) ........................ 10-2010-0083021

(51) Int. Cl.
*H04N 5/917* (2006.01)
*H04N 9/82* (2006.01)
(Continued)

(52) U.S. Cl.
CPC ..... *H04N 9/8211* (2013.01); *G11B 20/10527* (2013.01); *G11B 27/031* (2013.01);
(Continued)

(58) Field of Classification Search
CPC ....... G11B 27/105; H04N 5/85; H04N 9/8211
(Continued)

(56) References Cited

U.S. PATENT DOCUMENTS 7,734,655 B2  6/2010  Ando
2002/0069746 A1  6/2002  Taira et al.
(Continued)

FOREIGN PATENT DOCUMENTS

JP   2008-11235      1/2008
KR   10-2007-0109783 11/2007

OTHER PUBLICATIONS

U.S. Office Action dated Jul. 1, 2015 from U.S. Appl. No. 13/218,001.
(Continued)

*Primary Examiner* — Thai Tran
*Assistant Examiner* — Mishawn Hunter
(74) *Attorney, Agent, or Firm* — Staas & Halsey LLP

(57) ABSTRACT

An image storage apparatus, an image reproducing apparatus, a method of storing an image, a method of reproducing an image, a storage medium and a photographing apparatus are provided. The image storage apparatus records link information of a contents file within a moving image file and stores the linked moving image file. Accordingly, a user can select the moving image file to be displayed together with the linked contents file on one screen when the user reproduces the moving image file.

11 Claims, 19 Drawing Sheets

(51) Int. Cl.
  *G11B 27/034* (2006.01)
  *G11B 27/10* (2006.01)
  *H04N 9/79* (2006.01)
  *G11B 20/10* (2006.01)
  *G11B 27/031* (2006.01)

(52) U.S. Cl.
  CPC .......... *G11B 27/034* (2013.01); *G11B 27/105* (2013.01); *H04N 9/7921* (2013.01); *H04N 9/8227* (2013.01); *G11B 2020/10592* (2013.01)

(58) Field of Classification Search
  USPC ................................ 386/241, 285, 333, 331
  See application file for complete search history.

(56) References Cited

U.S. PATENT DOCUMENTS

| | | | |
|---|---|---|---|
| 2003/0048671 A1 | 3/2003 | Yoshikawa et al. | |
| 2004/0146285 A1 | 7/2004 | Matsui et al. | |
| 2004/0153970 A1* | 8/2004 | Shinoda | H04N 1/00132 715/273 |
| 2006/0020880 A1* | 1/2006 | Chen | 715/500.1 |
| 2006/0056796 A1* | 3/2006 | Nishizawa | G11B 27/00 386/240 |
| 2006/0143367 A1 | 6/2006 | Dubal et al. | |
| 2006/0233529 A1 | 10/2006 | Moriya et al. | |
| 2006/0245729 A1 | 11/2006 | Itoh et al. | |
| 2007/0014219 A1 | 1/2007 | Hirabayashi et al. | |
| 2007/0019932 A1* | 1/2007 | King et al. | 386/121 |
| 2007/0078898 A1 | 4/2007 | Hayashi et al. | |
| 2007/0086665 A1 | 4/2007 | Kim et al. | |
| 2007/0150462 A1 | 6/2007 | Nonaka et al. | |
| 2007/0186005 A1 | 8/2007 | Setlur et al. | |
| 2007/0282905 A1* | 12/2007 | Karlberg | 707/104.1 |
| 2008/0052267 A1* | 2/2008 | Hayashibara | G06F 17/30017 |
| 2009/0157750 A1 | 6/2009 | Kim et al. | |
| 2009/0208119 A1 | 8/2009 | Lee et al. | |
| 2009/0237519 A1 | 9/2009 | Fujii | |
| 2009/0268806 A1 | 10/2009 | Kim et al. | |
| 2009/0276465 A1 | 11/2009 | Namba et al. | |
| 2010/0146018 A1 | 6/2010 | Kim | |
| 2010/0217785 A1 | 8/2010 | Yun et al. | |

OTHER PUBLICATIONS

Office Action dated Oct. 11, 2013 in U.S. Appl. No. 13/218,001.
Office Action dated May 23, 2014 in U.S. Appl. No. 13/218,001.
Office Action dated Jan. 15, 2015 in U.S. Appl. No. 13/218,001.
Advisory Action dated Mar. 26, 2015 in U.S. Appl. No. 13/218,001.
U.S. Appl. No. 13/218,001, filed Aug. 25, 2011, Jin-su Myung, Samsung Electronics Co., Ltd.
U.S. Office Action dated Apr. 20, 2016 from U.S. Appl. No. 13/218,001.
Korean Office Action dated May 18, 2016 from Korean Patent Application No. 10-2010-0083021, 12 pages.
U.S. Office Action dated Dec. 19, 2016 from U.S. Appl. No. 13/218,001.
U.S. Office Action dated Jun. 15, 2017 from U.S. Appl. No. 13/218,001.

* cited by examiner

FIG. 7

| Edli Box | Bytes |
|---|---|
| Size | 4 |
| Type="edli" | 4 |
| version | 1 |
| Entry count | 4 |
| data_ID | 2 |
| Sync_Sample_Num | 4 |
| Play_Duration | 4 |
| data_name | 32 |

IMAGE STORAGE APPARATUS, IMAGE REPRODUCING APPARATUS, MEHOD OF STORING IMAGE, METHOD OF REPRODUCING AN IMAGE, RECORDING MEDIUM AND PHOTOGRAPHING APPARATUS

CROSS-REFERENCE TO RELATED APPLICATIONS

This application is a continuation of U.S. patent application Ser. No. 13/218,001, filed on Aug. 25, 2011, which claims the benefit under 35 U.S.C. §119 from Korean Patent Application No. 10-2010-0083021, filed on Aug. 26, 2010, in the Korean Intellectual Property Office, the disclosures of each of which are incorporated herein by reference in their entirety.

BACKGROUND

1. Field of the Invention

The present general inventive concept generally relates to an image storage apparatus, an image reproducing apparatus, a method of storing an image, a method of reproducing an image, a recording medium, and a photographing apparatus, and more particularly, to an image storage apparatus to store a photographed image, an image reproducing apparatus, a method of storing an image, a method of reproducing an image, a recording medium, and a photographing apparatus.

2. Description of the Related Art

In recent years, camcorders provide various functions other than a function to photograph an image. In addition, the camcorders could edit various photographed images according to a user's desired editing effect.

For example, the camcorders may provide a function to record the photographed image by including a still image as one file type. At this time, the camcorders are configured to add track data for a still image within a moving image file in a standard MP4 file format (i.e., Motion Picture Experts Group MPEG-4 file format) and to record the moving image file in which the track data is added.

However, in the case where a still image is provided in a recorded moving image and the stored as one file by using the above method, it is impossible to assist the reproducing function in the general-purpose player. Moreover, a user cannot reproduce only the still image data included in a moving image file to watch the still image data.

SUMMARY

Accordingly, there is a demand for a method for providing function to adding content to a moving image. The present general inventive concept provides an image storage apparatus which records link information of a contents file within a moving image file and stores the moving image file including the link information when storing the moving image file, and a method of storing an image applied thereto.

Additional embodiments of the present general inventive concept will be set forth in part in the description which follows and, in part, will be obvious from the description, or may be learned by practice of the general inventive concept.

Exemplary embodiments of the present general inventive concept may provide an image storage apparatus, including a storage unit to store a moving image file and a contents file are stored, and a controller to record link information of the contents file within the moving image file and to store the moving image file.

The moving image file may be a file of a moving picture experts group 4 (MPEG-4) standard.

The controller may record the link information of the contents file within a meta box of the MPEG-4 standard.

The controller may record the link information of the contents file within a user-defined data box of the MPEG-4 standard.

The link information of the contents file may include a file name of the contents file, a reproducing starting time point, and reproducing time information.

The contents file may be one of a moving image contents file, a still image contents file, and a text contents file.

Exemplary embodiments of the present general inventive concept may also provide an image reproducing apparatus including a storage unit to store a contents file and a moving image file, the moving image file in which link information of the contents file are recorded together with a moving image, and a controller to control a reproducing screen of the moving image file together with a reproducing screen of the contents file to be displayed for a specific period based on the link information.

The moving image file may be a file of an MPEG-4 standard.

The link information may be recorded within a meta box of the contents file according to the MPEG-4 standard.

The link information may be recorded within a user-defined data box of the contents file according to the MPEG-4 standard.

The link information of the contents file may include a file name of the contents file, a reproducing starting time point, and reproducing time information, and the specific period may be a period from the reproducing starting time point to a time point in which the reproducing time is terminated.

The contents file may be one of a moving image contents file, a still image contents file, and a text contents file.

Exemplary embodiments of the present general inventive concept may also provide a method of storing an image, including storing a contents file, and recording link information of the contents file within a moving image file and storing a moving image file in which the link information is recorded.

The moving image file may be a file of an MPEG-4 standard.

The link information of the contents file may include a file name of the contents file, a reproducing starting time, and reproducing time information.

Exemplary embodiments of the present general inventive concept may also provide a method of reproducing an image, including reproducing a moving image file, and displaying a reproducing screen of the moving image file together with a reproducing screen of a contents file linked by link information for a specific period based on the link information recorded within the moving image file.

The moving image file may be a file of an MPEG-4 standard.

The link information of the contents file may include a file name of the contents file, a reproducing starting time and reproducing time information and the specific period may be a period from the reproducing starting time point to a time point in which the reproducing time is terminated.

Exemplary embodiments of the present general inventive concept may also provide a computer-readable recording medium that includes computer-readable codes, that when executed by a computer, carry out a method of storing an image, the method including generating a contents file and a moving image file of an MPEG-4 standard are contained, and storing the moving image file in which link information for the contents file is recordable within a meta box or user-defined data box of the MPEG standard.

Exemplary embodiments of the present general inventive concept may also provide a photographing apparatus, including a camera unit to photograph a moving image, a capture unit to capture the moving image to generate a still image, a storage unit in which a moving image file and a still image file are stored, and when the still image is captured by the camera unit during photographing the moving image by the camera unit, a controller to store a captured still image file in the storage unit and to record link information for the still image within a moving image file generated by the camera unit.

The moving image file may be a file of an MPEG-4 standard.

The controller may record the link information of the captured still image file within a meta box or user-defined data box of the MPEG-4 standard.

The link information of the still image file may include a file name of the still image file, a reproducing starting time point and reproducing time information. The reproducing starting time point may be a time point where the still image file is captured within a reproducing time of the moving image which is being photographed and the reproducing time may be a preset time.

Exemplary embodiments of the present general inventive concept may also provide a photographing apparatus, including a first camera unit to photograph a first moving image, a second camera unit to photograph a second moving image, a storage unit to store a moving image file is stored, and when the second moving image is photographed by the second camera unit during photographing the first moving image by the first camera unit, a controller to store a photographed second moving image file in the storage unit and to record link information of the photographed second moving image file within a first moving image file which is generated by the first camera unit.

The first moving image file may be a file of an MPEG-4 standard.

The controller may record the link information for the photographed second moving image within a meta box or a user-defined data box of the first moving image file according to the MPEG-4 standard.

The link information for the second moving image file may include a file name of the second moving image file, a reproducing starting time point and reproducing time information. The reproducing starting time point may be a time point where the second moving image file starts to be photographed within a reproducing time of the first moving image which is being photographed and the reproducing time may be a reproducing time of the second moving image file.

Exemplary embodiments of the present general inventive concept may also provide an image forming apparatus, including an image capture apparatus to capture a moving image and a still image, a memory to store the captured moving image and the still image, and a controller to generate a contents file including link information, where the generated contents file is stored within a moving image file of the captured moving image in the memory.

The image forming apparatus may include a display to display the moving image file and the contents file including the link information.

The contents file can include at least one of a moving image contents file, a still image contents file, and a text contents file.

The contents file can include a time duration to display at least one of the moving image and the still image.

The contents file can include a frame number of the moving image to be displayed.

Exemplary embodiments of the present general inventive concept may also provide a method of capturing an image, the method including capturing a moving image and a still image, storing the captured moving image and the still image in a memory, and generating a contents file including link information, where the generated contents file is stored within a moving image file of the captured moving image in the memory.

The method may also include displaying the moving image file and the contents file including the link information on a display.

The contents file can include at least one of a moving image contents file, a still image contents file, and a text contents file.

The contents file can include a time duration to display at least one of the moving image and the still image.

As described above, according to exemplary embodiments of the present general inventive concept, the image storage apparatus and the method of storing an image applied thereto, which records the link information of the contents file within the moving image file and stores it when the moving image is stored, are provided so that when a user reproduces the moving image file, the moving image file can be displayed together with the linked contents file on one screen. The contents file, which is a link target, can be independently reproduced.

BRIEF DESCRIPTION OF THE DRAWINGS

These and/or other embodiments of the present general inventive concept will become apparent and more readily appreciated from the following description of the embodiments, taken in conjunction with the accompanying drawings of which:

FIG. 7 is a view illustrating a link information box according to an MPEG-4 format according to exemplary embodiments of the present general inventive concept;

DETAILED DESCRIPTION OF THE EMBODIMENTS

Figure 1:
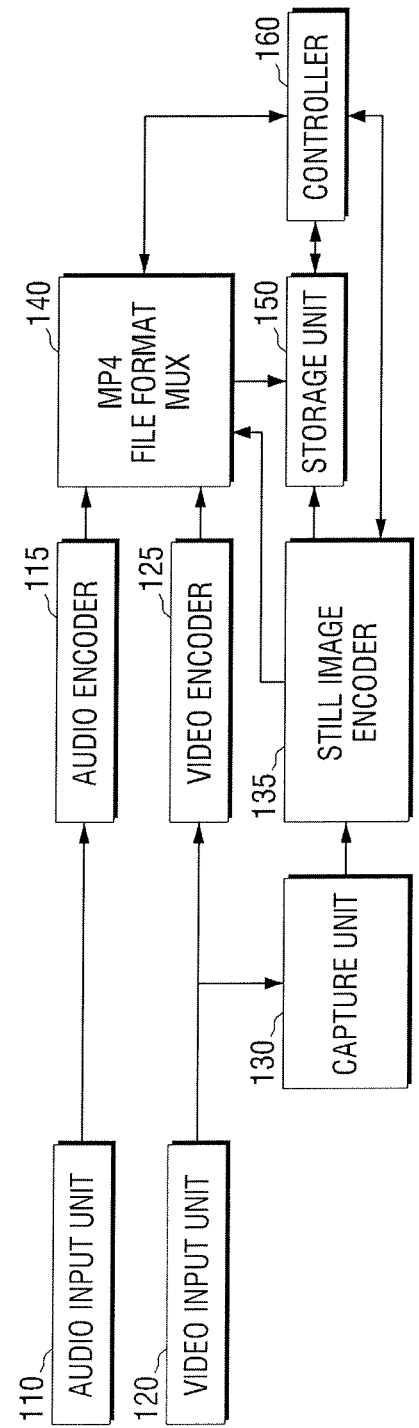
FIG. 1 is a view illustrating an image storage apparatus according to exemplary embodiments of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block illustrating an image storage apparatus 100 according to exemplary embodiments of the present general inventive concept. As illustrated in FIG. 1, the image storage apparatus 100 can include an audio input unit 110, an audio encoder 115, a video input unit 120, a video encoder 125, a capture unit 130, a still image encoder 135, an MP4 file format multiplexer (MUX) 140, a storage unit 150, and a controller 160.

The audio input unit 110 can receive an audio signal via a wired cable or a wireless connection, and/or may receive sound waves and convert them into an electrical signal. Specifically, the audio input unit 110 may be a microphone which directly receives sound, or an audio interface which receives an audio signal from another apparatus.

The audio encoder 115 can compress the received audio signal using an audio compression such as arithmetic coding (AC), advanced audio coding (AAC), bit-sliced arithmetic coding (BSAC), moving picture experts group (MPEG) audio layer-3 (MP3), and the like to generate an audio bit stream. The audio encoder 115 can output the generated audio bit stream to the MP4 file format MUX 140. The audio encoder 115 can be an integrated circuit, a processor, and/or any suitable encoder to carry out the exemplary embodiments of the present general inventive concept disclosed herein.

The video input unit 120 can receive a video signal via a wired and/or wireless link, and/or may include one or more lenses and an image sensor to capture at least one image. More specifically, the video input unit 120 may be a camera which can photograph and/or capture an image, or a video interface which receives a video signal from another apparatus.

The video encoder 125 can compress the received video signal using video compression such as MPEG or H.26x to generate video bit stream. The video encoder 125 can output the generated video bit stream to the MP4 file format MUX 140. The video encoder 125 can be an integrated circuit, a processor, and/or an encoder to carry out the exemplary embodiments of the present general inventive concept disclosed herein.

The capture unit 130 can capture a specific scene of the video signal received from the video input unit 120. The capture unit 130 can output a still image signal for the captured image to the still image encoder 135. The capture unit 130 may be an integrated circuit, a processor, a filed programmable gate array, a programmable logic device, and/or any suitable capture unit to carry out the exemplary embodiments disclosed herein.

The still image encoder 135 can compress the captured still image signal using a compression such joint photographic experts group (JPEG) and the like. The still image encoder 135 can store the compressed still image data in the storage unit 150.

The still image encoder 135 transmits information for the still image to the MP4 file format MUX 140.

The MP4 file format MUX 140 can generate a moving image file of the MPEG-4 standard (e.g., the MP-4 standard) using the audio stream output from the audio encoder 115 and the video stream output from the video encoder 125. The MP4 file format can store the generated MP4 file in the storage unit 150. The MP4 file format MUX 140 may be a multiplexer, an integrated circuit, a processor, and/or any suitable multiplexer to carry out the exemplary embodiments of the present general inventive concept as disclosed herein.

The MP4 file format MUX 140 can record separate link information of a contents file included with the moving image file, when the MP4 file format MUX 140 generates the moving image file. Herein, the contents file may be any one of a moving image contents file, a still image contents file, and a text contents file. For example, the MP4 file format MUX 140 may record the link information for the stored still image file output from still image encoder 135 within the moving image file.

Herein, the link information can include information to link the separate contents file with the moving image file. Accordingly, the moving image file including the link information can be displayed together with the linked contents file during reproduction (e.g., reproduction of the moving image on a display). That is, a user can select from the link information to reproduce one of the linked items (e.g., a still image file, and audio file, etc.).

The link information can include a file name of the contents file, a reproducing starting time point, and reproducing time information. For example, the file name of the contents file may be 'still image.jpg', the reproducing starting time point may be frame No. 30, and the reproducing time information may be '2 minutes'. A detailed configuration of the link information will be explained later with reference to FIG. 7.

The link information may be recorded within a meta box or user-defined data box of the moving image file of the MPEG-4 standard and/or the MP4 standard (MPEG-4 and MP4 are interchangeably used herein throughout). The box file structure (i.e., that includes the meta box and/or the user defined box) can define the best use of the file, and the specifications to which the file complies.

The MP4 file format MUX 140 can generate the moving image file by including the link information when it generates the moving image file.

The storage unit 150 can store the moving image file and the contents file. Herein, the moving image file corresponds to a moving image file of the MPEG-4 standard. The storage unit 150 may be a digital storage device, such as one or more hard disk drives, memory devices (e.g., Random Access Memory (RAM), Flash memory, etc.), solid state drives, and/or any suitable storage unit to carry out the exemplary embodiments of the present general inventive concept as disclosed herein.

The controller 160 can control the operation of the image storage apparatus 100. The controller 160 may be an integrated circuit, a processor, a field programmable gate array, a programmable logic device, an application specific integrated circuit, and/or any other suitable controller to carry out the exemplary embodiments of the present general inventive concept. More specifically, the controller 160 can control the MP4 file format MUX 140 to record the link information of the content file within the moving image file and store the moving image file including the link information in the storage unit 150.

The controller 160 can control the link information of the contents file to be recorded within a meta box or user-defined data box of the MPEG-4 standard.

The controller 160 can control the link information of another contents file to be included within the moving image file and which is to be stored.

The controller 160 may store the moving image file (e.g., the moving image file that is formatted in the MPEG-4 standard) in a separate recording medium (e.g., in a different recording medium from the storage unit 150, or in a different storage area in the storage unit 150). The moving image file can correspond to a file in which the link information of the contents file is within a meta box or user-defined box of the MPEG-4 standard. Herein, the recording medium may be a computer-readable recording medium. For example, a compact disk (CD), a digital versatile disk (DVD), a Blue-ray disk (BD), a flash memory, a universal serial bus (USB) memory device and the like may be used as the recording medium.

The image storage apparatus 100 can store the moving image file of the MPEG-4 by linking a separate contents file. The image storage apparatus 100 can generate the moving image file of the MPEG-4 standard including the link information of the separate contents file. When the moving image file including the link information is reproduced, the linked contents file is also displayed for a predetermined period of time (i.e., a specific period).

Figure 2:
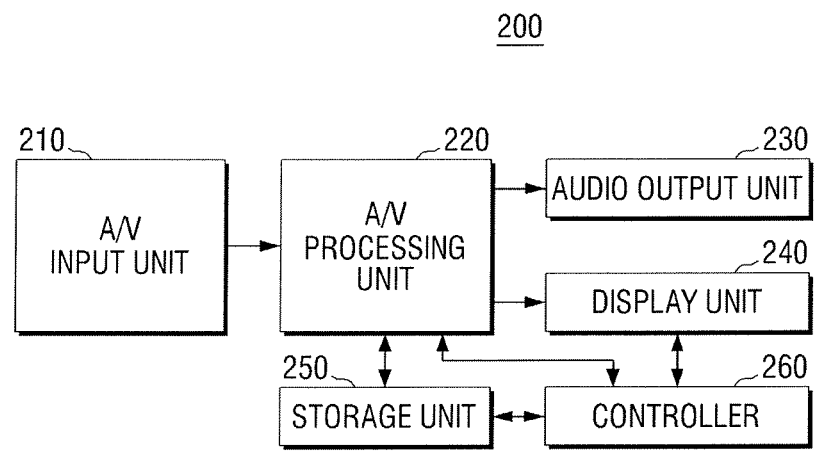
FIG. 2 is a view illustrating an image reproducing apparatus according to exemplary embodiments of the present general inventive concept.

Hereinafter, an image reproducing apparatus 200 to reproduce a moving image file of the MPEG-4 as described above will be explained with reference to FIG. 2. FIG. 2 is a view illustrating an image reproducing apparatus according to exemplary embodiments of the present general inventive concept.

As illustrated in FIG. 2, the image reproducing apparatus 200 can include an audio/video (A/V) input unit 210, an A/V processing unit 220, an audio output unit 230, a display unit 240, a storage unit 250, and a controller 260.

The A/V input unit 210 can receive moving image data including audio and video. More specifically, the A/V input unit 210 can receive a moving image file having a MPEG-4 format. The A/V input unit 210 can be an interface to receive moving image data via a wired and/or wireless communications link. The A/V input unit may include an image capture apparatus to capture moving images and/or still images, and may include an apparatus to receive sound waves and convert the sound into an electrical signal.

The A/V processing unit 220 can decode the moving image file of the MPEG-4 format to divide audio data and video data. The A/V processing unit 220 can output the audio data to the audio output unit 230 and the video output to the display unit 240. The A/V processing unit 220 can be a processor, an integrated circuit, a programmable logic device, a field programmable gate array, an application specific integrated circuit, and/or any suitable processing unit to carry out the exemplary embodiments of the present general inventive concept as disclosed herein.

The storage unit 250 can store the moving image file including a contents file and link information of the contents file. The moving image file is a moving image file of the MPEG-4 format. The link information for the contents file stored in the storage unit 250 can be recorded within a meta box or user-defined box of the moving image file of the MPEG-4 standard. The storage unit 250 may be a digital storage device, such as one or more hard disk drives, memory devices (e.g., Random Access Memory (RAM), Flash memory, etc.), solid state drives, and/or any suitable storage unit to carry out the exemplary embodiments of the present general inventive concept as disclosed herein.

The controller 260 can control the operation of the image reproducing apparatus 200. More specifically, the controller 260 can control the reproduction of the moving image file stored in the storage unit 250. The controller 260 can be a processor, an integrated circuit, a programmable logic device, a field programmable gate array, an application specific integrated circuit, and/or any suitable controller to carry out the exemplary embodiments of the present general inventive concept as disclosed herein.

The controller 260 can control the display of a reproducing screen of the moving image file together with a reproducing screen of the contents file for a predetermined period of time (e.g., specific period) based on the link information when reproducing the moving image file. For example, the controller 260 can control the display of the reproducing screen of the contents file on the reproducing screen of the moving image file in a picture in picture (PIP) screen.

The link information can include a file name of the contents file, a reproducing starting time point, and reproducing time information. For example, a file name of the moving image file can be 'moving image1.mp4', the file name of the contents file included in the link information of the moving image file can be 'still image.jpg', the reproducing starting time point can be frame No. 30, and the reproducing time information can be '2 minutes'. When a frame of frame No. 30 of 'moving image1.mp4' is reproduced, the controller can display 'still image.jpg' on the screen. After 2 minutes have elapsed, the controller 260 can remove 'still image.jpg' that is displayed on the screen.

When a time point is reached where the contents file is to be displayed based on the link information during reproducing the moving image, the controller 260 can control the display of the reproducing screen of the moving image together with the reproducing screen of the contents file during a reproducing period.

As described above, the image reproducing apparatus 200 can reproduce the moving image file and can reproduce another contents file linked with the moving image file for a predetermined period or time.

Thus, since another contents file is linked with the moving image file of the MPEG-4 standard, a user can confirm the linked contents file on one screen when the user reproduces the moving image. The user can confirm the contents file which is a link target by independently reproducing the contents file.

Hereinafter, a method of storing an image and a method of reproducing an image will be explained with reference to FIGS. 3 and 4.

Figure 3:
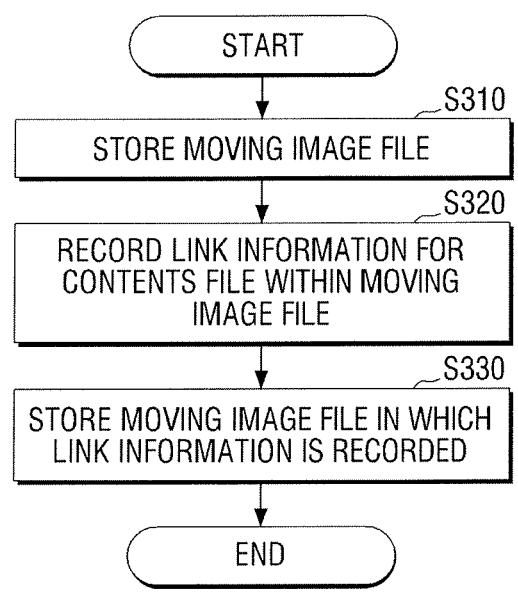
FIG. 3 is a flowchart illustrating a method of storing an image according to exemplary embodiments of the present general inventive concept.

FIG. 3 is a flowchart illustrating a method of storing an image according to exemplary embodiments of the present general inventive concept.

The image storage apparatus 100 can separately store a contents file at operation S310.

When the image storage apparatus 100 generates a moving image file, it can record link information of the contents file within the moving image file at operation S320. Herein, the contents file may be any one of a moving image contents file, a still image contents file, and a text contents file.

The moving image file can be a moving image file of the MPEG-4 standard. The link information may be recorded in a meta box or user-defined data box of the moving image file of the MPEG-4 standard.

The image storage apparatus 100 can store the moving image in which the link information is recorded at operation S330. For example, the image storage apparatus 100 may record link information for the captured and stored still image file within the moving image file.

Through the above-described method, the image storage apparatus 100 can store the moving image file link with another contents file.

Figure 4:
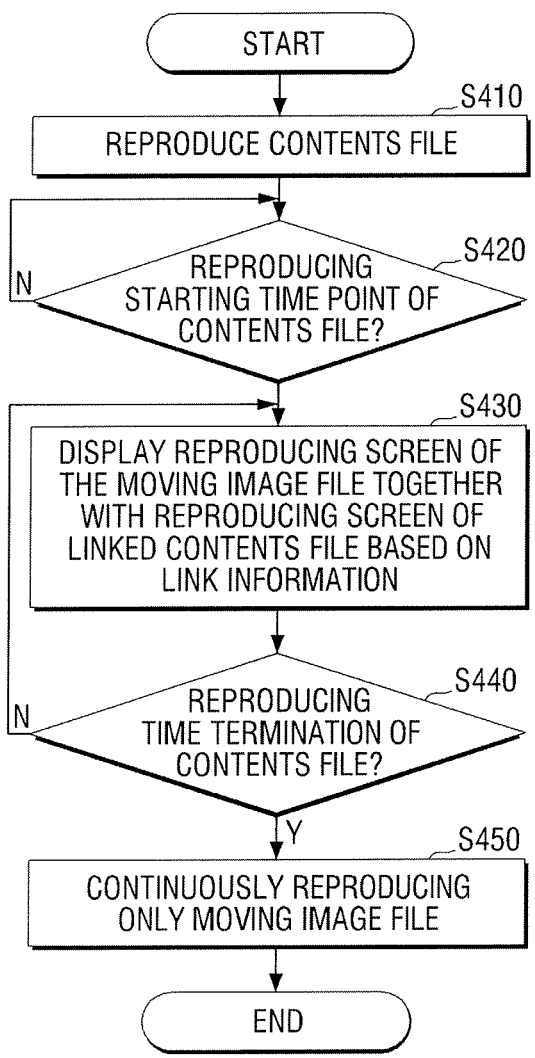
FIG. 4 is a flowchart illustrating a method of reproducing an image according to exemplary embodiments of the present general inventive concept.

FIG. 4 is a flow chart illustrating a method of reproducing an image according to exemplary embodiments of the present general inventive concept.

The image reproducing apparatus 200 can reproduce the stored moving image file according to a user's received input at operation S410. The reproducing moving image file can be a moving image file of the MPEG-4 standard which can be linked with another contents file.

The image reproducing apparatus 200 can determine where a reproducing starting time point of the linked contents file is or not based on the link information, during reproducing the moving image file at operation S420.

If the reproducing starting time point reaches at operation S420-Y, the image reproducing apparatus 200 can display a reproducing screen of the moving image file together with a reproducing screen of the contents file for a predetermined period (i.e., a specific period) based on the link information at operation S430. For example, the image reproducing apparatus 200 can display the reproducing screen of the contents file on the screen which displays the moving image in PIP screen.

The image reproducing apparatus 200 can determine whether a termination time point of a reproducing time of the contents file is or not based on the reproducing time information of the link information at operation S440. If the reproducing time of the contents file at operation S440-N does not reach the termination time point, the image reproducing apparatus 200 can continuously display the moving image file and the contents file at operation S430.

When the reproducing time reaches the termination time point at operation S430-Y, the image reproducing apparatus 200 can remove the reproducing screen of the contents file and can continuously display only the reproducing screen of the moving image at operation S450.

For example, it can be assumed that a file name of the moving image file is 'moving image 1.mp4', a file name of the contents file included in the link information of the moving image file is 'still image.jpg', a reproducing starting time point is frame No. 30, and the reproducing time information is '2 minutes'. When a frame of frame No. 3 in 'moving image 1.mp4' starts to be reproduced, the image reproducing apparatus 200 can display 'still image.jpg' on a screen together with the reproducing image of the moving image file. When 2 minutes have elapsed, the image reproducing apparatus 200 can remove 'still image.jpg' that is displayed on the screen.

Thus, when the time point where the other contents are to be displayed is during the reproducing of the moving image file, the image reproducing apparatus 200 can display the reproducing screen of the moving image file as well as the reproducing screen of the contents file during a reproducing period.

As above described, the image reproducing apparatus 200 can reproduce the moving image file, as well as reproduce the moving image file and the contents file linked with the moving image file for a predetermined time.

Since another contents file can be linked within a moving image file of the MPEG-4 standard, when a user reproduces the moving image file, the user can confirm the moving image file together with the contents file on one screen. The user may confirm the contents file of a link target by independently reproducing the contents file.

Hereinafter, a configuration of a moving image file of the MPEG-4 and a detailed configuration of link information included in the moving image file will be explained with reference to FIGS. 5 to 9.

Figure 5:
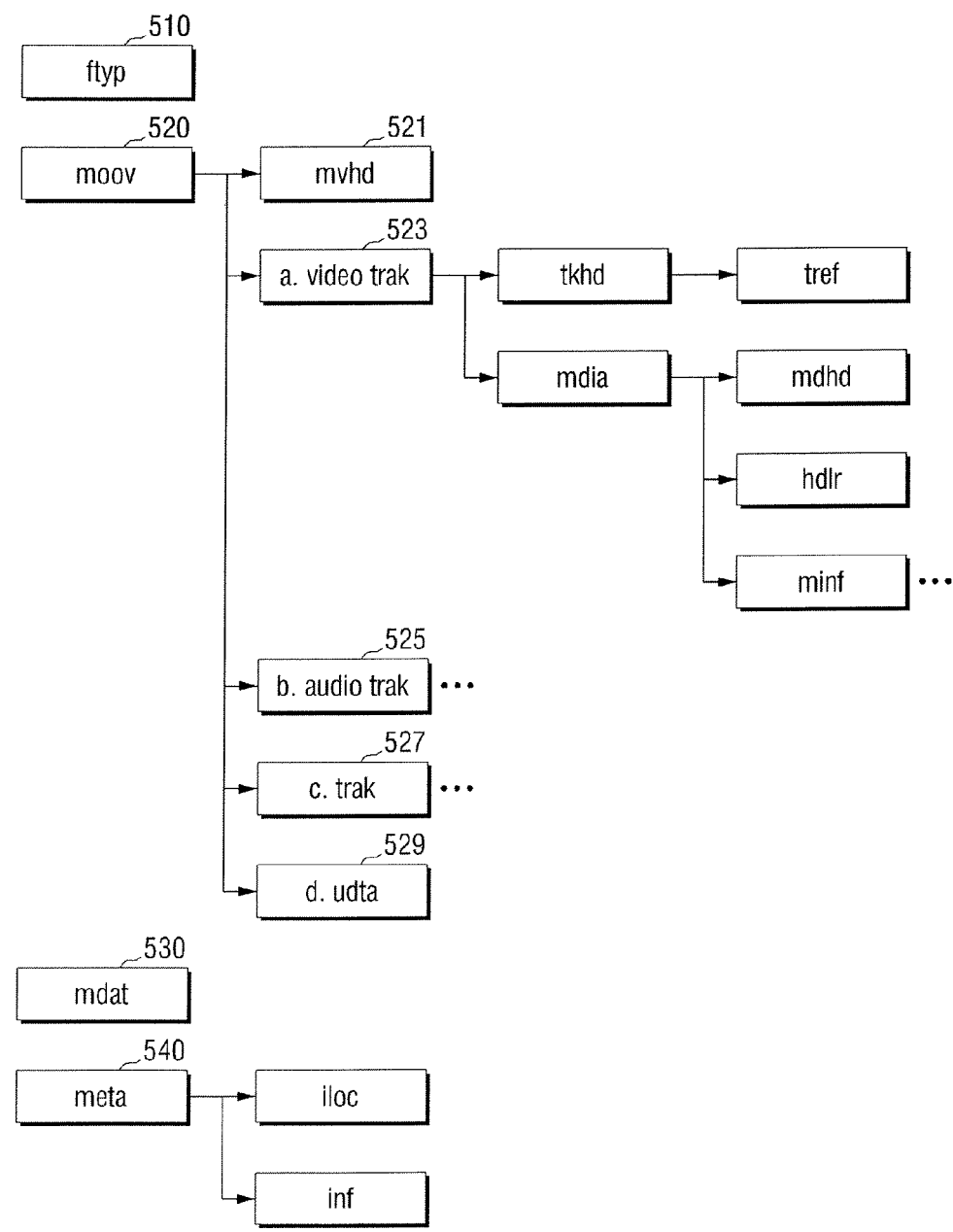
FIG. 5 is a view illustrating a moving picture experts group 4 (MPEG-4 or MP-4) file format according to exemplary embodiments of the present general inventive concept.

FIG. 5 is a view illustrating a MPEG-4 file format according to exemplary embodiments of the present general inventive concept. FIG. 5 is a view illustrating a file format according to the MPEG-4 standard, and the format is can be referred to as a container configuration of an MPEG-4 file. The container configuration of the MPEG-4 file can be configured from boxes that may include various data. The above-described configuration can comply with the MPEG-4 standard, and a detailed description for each box will be omitted and only parts of the exemplary embodiments of the present general inventive concept will be briefly explained.

As illustrated in FIG. 5, the MPEG-4 file can include a ftyp box 510, a moov box 520, mdat box 530, and a meta box 540.

The ftyp box 510 can be a box area in which information for a file type of the MPEG-4 file is stored.

The moov box 520 can be an area in which information for contents of the MPEG-4 file is recorded in detail. As illustrated in FIG. 5, the moov box 520 can include a mvhd box 521, a video trak box 523, an audio trak box 525, a trak box 527, and an udta box 529.

The mvhd box 521 can correspond to a box in which header information for the moving image contents is recorded. The video trak box 523 can be a box in which information for a video part of the moving image is recorded. The video trak box 523 can include a tkhd box, where the tkhd box can include a tref box. The video trak box 523 can include a mdia box, where the mdia box can include a mdhd box, a hdlr box, and a minf box. The tkhd, tref mdia, mdhd, hdlr and minf boxes are boxes of the MPEG4 standard. The tkhd box may include track header information, the tref box may include track reference information, the mdia box may include media information, the mdhd box may include media header information, the hdlr box may include a handler declaration, and the minf box may include media information.

The audio trak box 525 can be a box in which an audio part of the moving image is recorded. Trak box 527 may include track header information. The udta box 529 is an area in which information arbitrarily set by a user can be recorded and can correspond to a user-defined data box.

The mdat box 530 can correspond to a box area in which substantial contents data is recorded.

The meta box 540 can correspond to a meta box including meta information of contents. The meta box 540 includes an iloc box (item location box) and an inf box (item information box).

For the MPEG-4 moving image file of the above-described configuration, link information can be recorded in a box type within the udta box 529 or the meta box 540.

Figure 6:
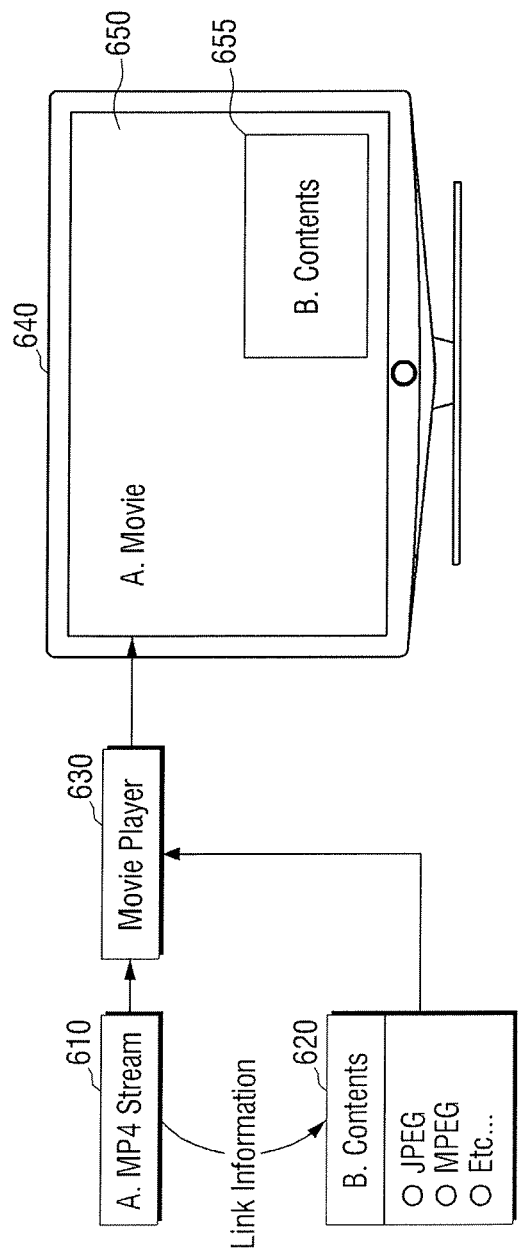
FIG. 6 is a view illustrating a method of reproducing a MP4 file according to exemplary embodiments of the present general inventive concept.

FIG. 6 is a view illustrating a method of reproducing an MP4 file according to exemplary embodiments of the present general inventive concept. As illustrated in FIG. 6, link information can be included in 'A.MP4 stream' which is a moving image file, and the link information can include a link for 'B.Contents' which is another contents file.

An image reproducing apparatus 630 can read out (e.g., simultaneously read out) 'A. MP4 Stream' of the moving image file and 'B. Contents' of the contents file to transmit them to a display device 640. When it is time to reproduce the linked contents file based on the link information, the display device 640 can display a reproducing screen 655 of the contents file within a reproducing screen 650 of the moving image file in a PIP screen type.

When the moving image file linked with the contents file is reproduced, the display device 640 can display the reproducing screen 650 of the moving image file together with the reproducing screen 660 of the contents file.

FIG. 7 is a view illustrating a link information box based on the MPEG-4 format according to exemplary embodiments of the present general inventive concept. As illustrated in FIG. 7, the link information box (external data link information box: Edli) can include size information, type information, version information, entry count information, data_ID information, Sync_Sample-Num information, Play_Duration information, and data_name information.

The size information can include the whole size of the link information box.

The type information can include type information of the link information box, and "edli" can indicate that the present box is the link information box. The title of the type may be changed.

The version information can include a version of the link information box.

The entry count information can include a number of data corresponding to the link information. For example, in the case where four (4) contents files are linked with the moving image file, the entry information can be four.

The data_ID information can be information that includes a contents to be a link target. For example, data_ID of JPEG contents may be '0x01', data_ID of text contents may be '0x02', data_ID of MP4 contents may be '0x03', data_ID of MOV contents may be '0x04', and data_ID of audio video interleaving (AVI) contents may be '0x05'. Herein, the JPEG contents includes still image contents and the AVI contents, the MOV contents, and where the AVI contents include moving image contents.

The Sync_Sample_Num information includes a reproducing starting time point of a contents file with respect to a reproducing time of a moving image file. That is, the Sync_Sample_Num information can include reproducing starting time point information of a contents file. The reproducing starting time point may include a reproducing time of the moving image file or a frame number of the moving image file. For example, when the contents file is a captured still image, the reproducing starting time point information may be a time point where the still image file is captured within the reproducing time of the moving image file. When the contents file is a moving image file photographed by a separate camera, the reproducing starting time point information may be a time point where the contents file (that is, the photographed moving image file) starts to be photographed within the reproducing time of the moving image file.

The Play_Duration information can include time information at which a contents time is reproduced. In other words, the Play_Duration information can be reproducing time information for the contents file. For example, when the contents file is a captured still image file, the reproducing time information may be a preset time. When the contents file is a moving image file photographed by a separate camera, the reproducing time point information can be a reproducing time of the contents file (that is, the photographed moving image file).

The name_file information includes file name information of a contents file.

Thus, various information can be recorded to comply with a box standard based on the MPEG-4 format in the link information box.

Figure 8:
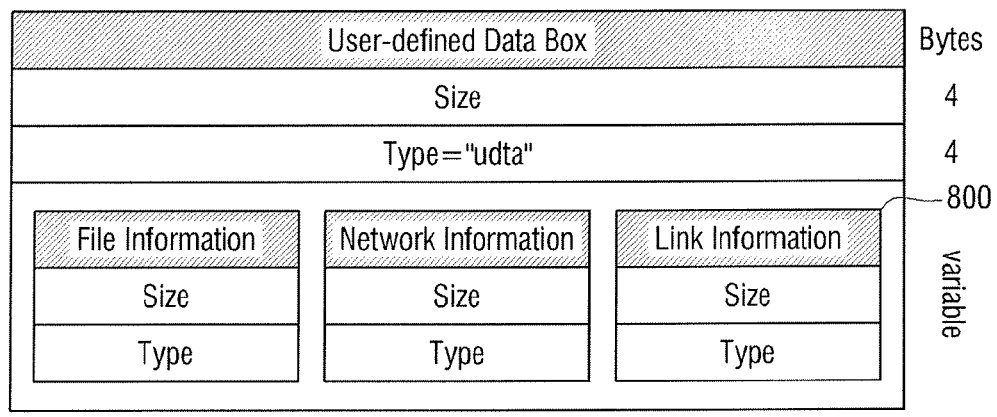
FIG. 8 is a view illustrating link information that is included within a user-defined data box according to exemplary embodiments of the present general inventive concept.

FIG. 8 is a view illustrating when link information is included within a user-defined data box according to exemplary embodiments of the present general inventive concept. As illustrated in FIG. 8, it can be confirmed that a link information box 800 together with a file information box and a network information box are included within a user-defined data box.

Figure 9:
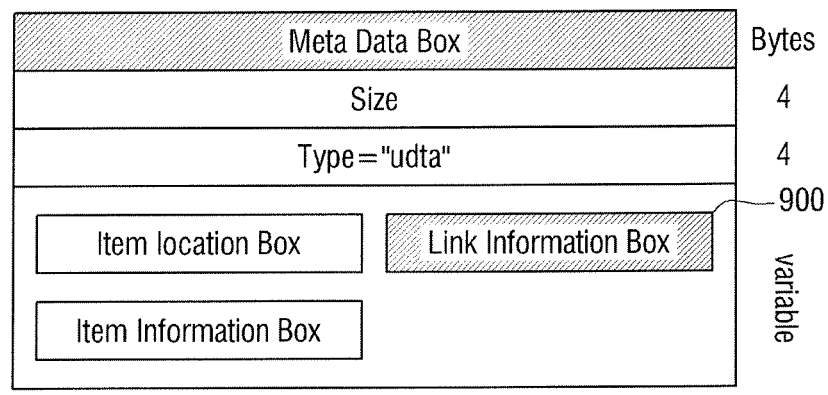
FIG. 9 is a view illustrating link information that is included within a meta data box according to exemplary embodiments of the present general inventive concept.

FIG. 9 is a view illustrating when link information is included within a meta data box according to exemplary embodiments of the present general inventive concept. As illustrated in FIG. 9, it can be confirmed that a link information box 900 together with an item location box and an item information box can be included within a meta data box.

As described above, the link information box can be included in the user-defined data box or meta data box within the moving image file by complying with the MPEG-4 standard.

Hereinafter, methods of generating and reproducing a moving image file with which a still image file is linked is described with reference to FIGS. 10 to 12C.

Figure 10:
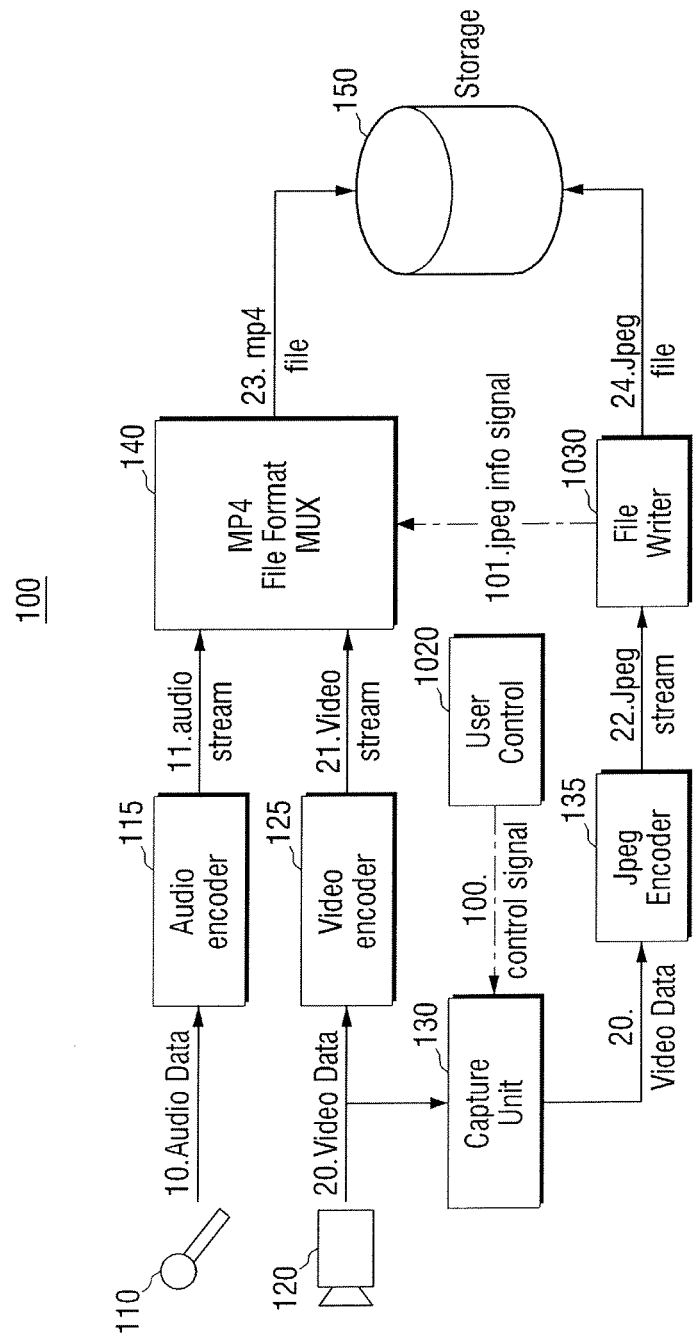
FIG. 10 is a view illustrating a camcorder according to exemplary embodiments of the present general inventive concept.

FIG. 10 is a view illustrating a detailed configuration of a camcorder according to exemplary embodiments of the present general inventive concept. FIG. 10 illustrates where the image storage apparatus 100 of FIG. 1 can be a camcorder. Accordingly, in FIG. 10, the audio input unit 110 can be a microphone and the video input unit 120 can be a camera unit. In FIG. 10, description of parts which are the same as those of FIG. 1 will be omitted and only other parts will be described.

As illustrated in FIG. 10, the camcorder that is the image storage apparatus 100 can include a user controller 1020 and a file writer 1030. The user controller 1020 can receive an input control signal from a user to perform a capture operation and can transmit the input control signal to a capture unit 130.

The file writer 1030 can generate a JPEG (Joint Photographic Experts Group) stream which is an encoded still image file in a file type and can store the generated JPEG file in a storage unit 150. The file writer 1030 may be an integrated circuit, a processor, and/or any other suitable device to generate a data stream and encode a still image file according to the exemplary embodiments of the present general inventive concept as disclosed herein.

An operation of the camcorder that is the image storage apparatus 100 of FIG. 10 will be described as follows.

The microphone of the audio input unit 110 can convert sound into audio data. The microphone of the audio input unit 110 can transmit the audio data 10 to an audio encoder 115. The audio encoder 115 may be an integrated circuit, a processor, and/or any suitable encoder to carry out the exemplary embodiments of the present general inventive concept as disclosed herein. The audio encoder 115 can compress the audio data 10 in audio stream 11 and can transmit the audio stream 11 to an MP4 file format MUX 140.

The camera of the video input unit 120 can photograph a moving image and can transmit photographed video data 20 to a video encoder 125. The video encoder 125 may be an integrated circuit, a processor, and/or any suitable encoder to carry out the exemplary embodiments of the present general inventive concept as disclosed herein. The video encoder 125 can compress the video data 20 in video stream 21 and can transmit the video stream 21 to the MP4 file format MUX 140.

The capture unit 130 can capture the photographed image based on the control input received via the user controller 1020. The capture unit 130 can transmit the captured video data 20 to a still image encoder (JPEG encoder) 135. The still image encoder 135 can be a processor, an integrated circuit, or any suitable encoder to carry out the exemplary embodiments of the present general inventive concept. The still image encoder 135 can compress the captured video data 20 in still image stream (JPEG steam) 22 and can transmit the still image stream 22 to the file writer 1030.

The file writer 1030 can generate a still image file (JPEG file) 24 using the still image stream 22 and can store the generated still image file 24 in the storage unit 150. The file writer 1030 can transmit a still image information signal (JPEG info signal) 101 to the MP4 file format MUX 140. Herein, the still image information signal can be information provided to generate link information and can include file name information of the still image file, reproducing starting time point information, and reproducing time information.

The MP4 file format MUX 140 can generate a MP4 moving image file (MP4 file) 23 using the audio stream 11 and the video stream 21 and can store the MP4 moving image file in the storage unit 150. The MP4 file format MUX 140 can include the link information in the MP4 moving image file 23 using the still image information signal 101 and can store the MP4 moving image file including the link information.

The link information may include a file name of the still image file captured by the capture unit 130, a reproducing starting time point, and reproducing time information. Herein, the reproducing starting time point can be a time point where the still image file is captured within a reproducing time of a moving image that is being photographed. The reproducing time can be a preset time. More specifically, if a still image was captured at time point where 10 minutes have elapsed after a moving image begins to be photographed, a name of the still image file is 'still image 1.jpg' and the reproducing time of the still image is set as 2 minutes, a controller 160 can set the name of the still image file as 'still image 1.jpg', the reproducing starting time point as 10 minutes, and the reproducing time as 2 minutes for the link information of the photographed moving image.

The above process can be controlled to be performed by the control unit of the camcorder of the image storage apparatus 100. More specifically, when the moving image is photographed by the camera unit 110 and when the still image is captured by the camera unit 110, the controller can control the storage of the captured still image file in the storage unit and can record link information for the still image file within the moving image file.

Figure 11:
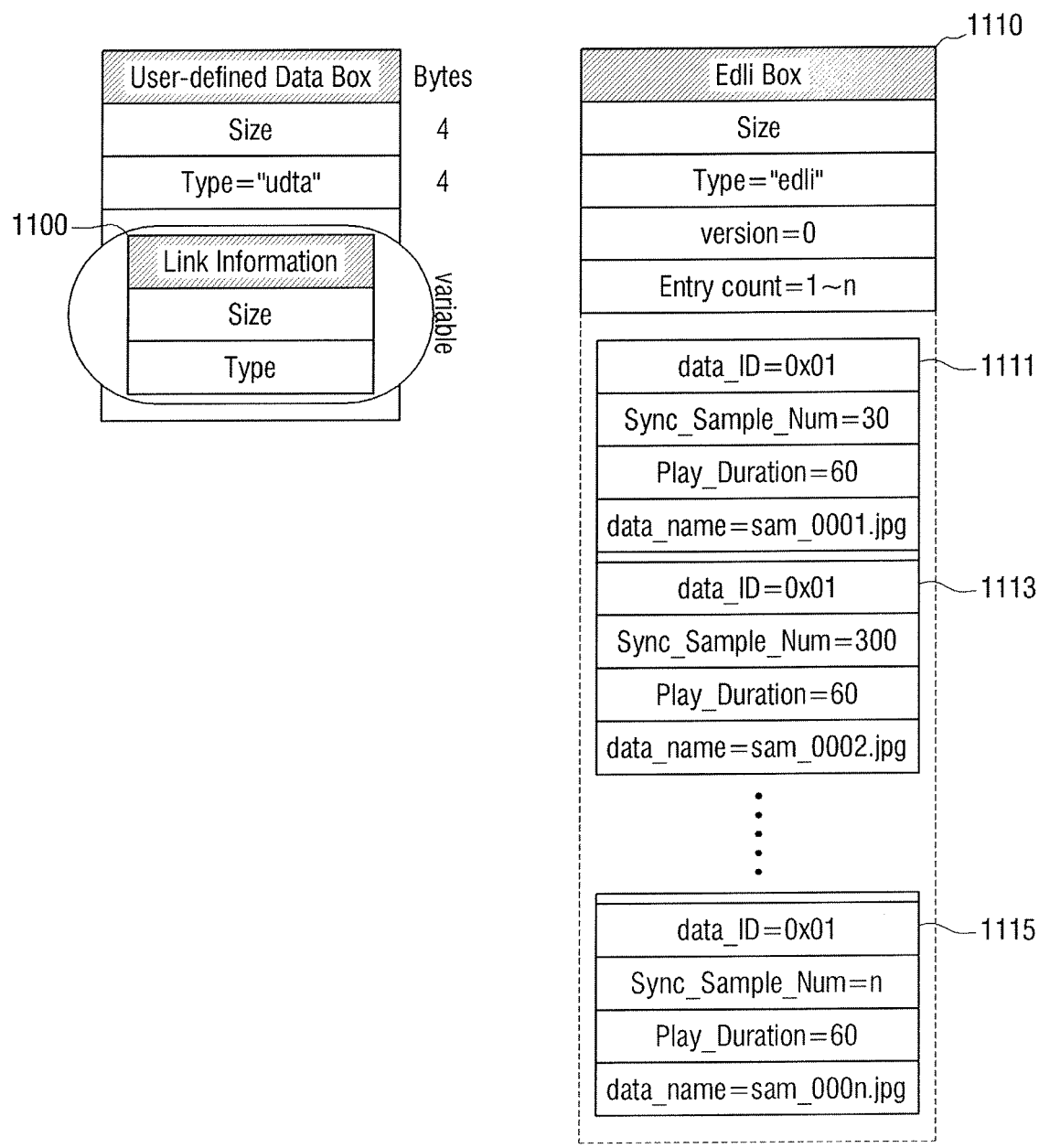
FIG. 11 is a view illustrating an example of line information for a still image file according to exemplary embodiments of the present general inventive concept.

FIG. 11 is a view illustrating an example of link information for a still image file according to exemplary embodiments of the present general inventive concept. FIG. 11 illustrates where a link information box 1110 can be stored within a user-defined data box 1100 of a moving image file.

In FIG. 11, n still images can be linked with a moving image file within the link information box 1110. Therefore, the Entry count can be '1 to n'.

Referring to first still image file link information 1111, data_ID can be '0x01' so as to indicate a JPEG still image file. Sync_Sample_Num can be '30' so as to indicate that a reproducing starting time point of a first still image file is a $30^{th}$ frame of a moving image file. Play_Duration can be '60' so as to indicate that a reproducing time of the first still image file is 60 seconds. Data_name can be 'sam_0001.jpg' so as to indicate a file name of the first still image file.

A second still image file link information 1113 to nth still image file link information 1115 can be included in the link information box 1110.

Thus, a plurality of still image files may be linked in the link information box 1110.

Figure 12A:
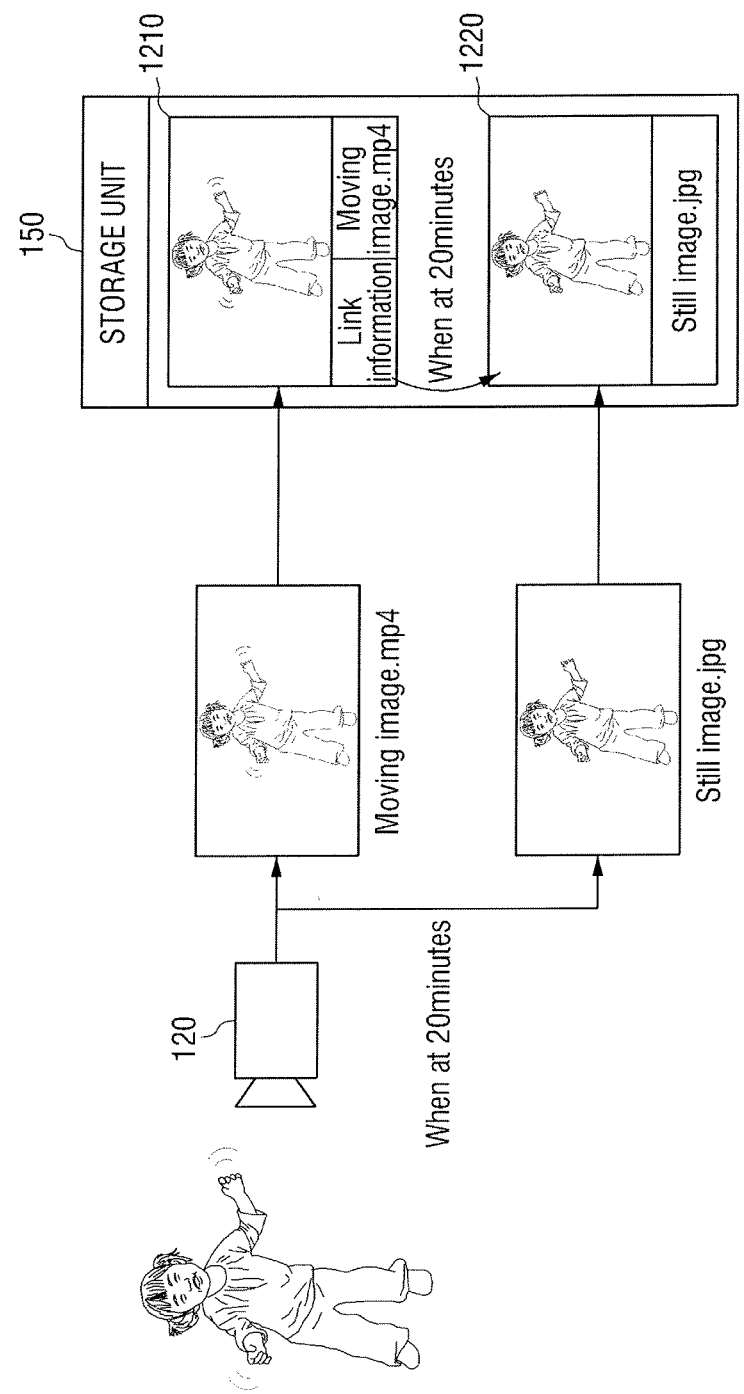
FIGS. 12A to 12C are views illustrating methods of linking a moving image photographed by a camcorder with a still image, storing the linked moving image file, and reproducing the moving image according to exemplary embodiments of the present general inventive concept.
Figure 12B:
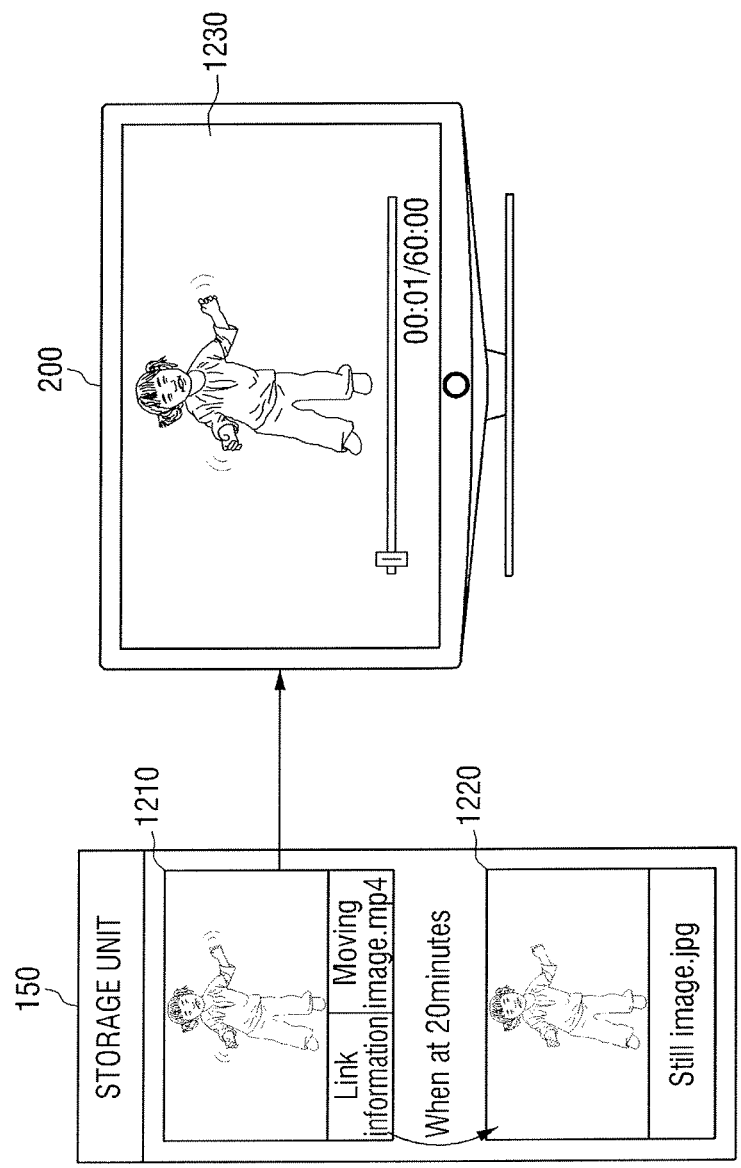
Figure 12C:
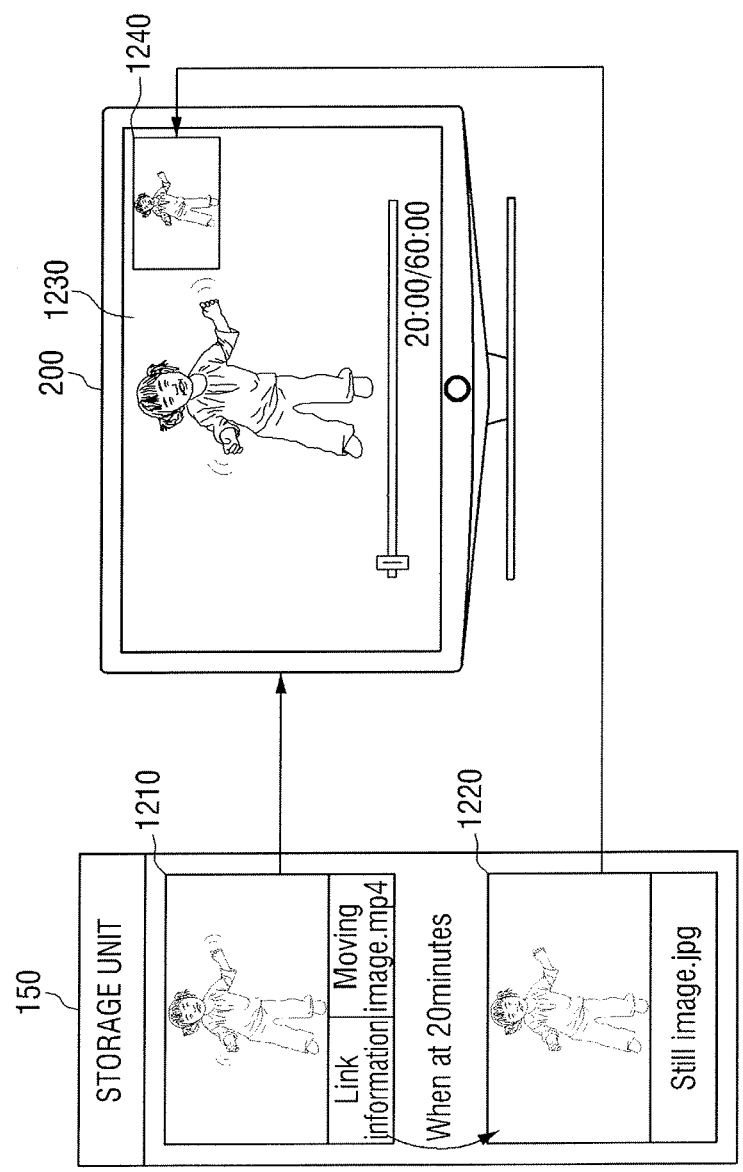

FIGS. 12A to 12C are views illustrating methods of linking a still image with a moving image captured by a camcorder, storing the moving image linked with the still image, and reproducing the moving image according to exemplary embodiments of the present general inventive concept.

FIG. 12A illustrates where a moving image file (moving image.mp4) is photographed by the camera unit 120 of the camcorder of the image storage apparatus 100. At the time point where 20 minutes have elapsed after the moving image file begins to be photographed, the camcorder 100 can capture a still image file (still image.jpg) by the control of a user.

A moving image file 1210 and a still image file 1220 can be separately stored in the storage unit 150. Link information for a still image file can be included in the moving image file 1210. A reproducing starting time point of the still image (e.g., when 20 minutes is within a reproducing time of the moving image) can be set at the time point where the still image is captured.

FIG. 12B is a view illustrating a screen on which the moving image file 1210 photographed by the camcorder of the image storage apparatus 100 can be reproduced in the image reproducing apparatus 200. As illustrated in FIG. 12B, the image reproducing apparatus 200 can display a reproducing screen 1230 of the moving image file 1210 on screen. For example, a present reproducing time can be 1 second.

FIG. 12C is a view illustrating a screen on which the moving image file 1210 photographed by the camcorder of the image storage apparatus 100 together with the still image file 1220 can be reproduced in the image reproducing apparatus 200.

In FIG. 12C, the image reproducing apparatus 200 can reproduce the moving image file at the time point where the reproducing time of the moving image file 1210 can be 20 minutes. According to the link information of the moving image file 1210, it is recorded that the still image is displayed at the time point where the reproducing time of the moving image file reaches 20 minutes.

Accordingly, the image reproducing apparatus 200 can display the reproducing screen 1230 of the moving image file together with the reproducing screen 1240 of the still image file in a PIP screen type.

The image apparatus 200 can display the still image for a preset time (for example, 2 minutes) set in the reproducing time information of the link information in a PIP type. If the preset time elapses, the image reproducing apparatus 200 can display only the reproducing screen 1230 of the moving image file as illustrated in FIG. 12B.

The camcorder of the image storage apparatus 100 can capture the photographing image and link the captured still image file with the photographing moving image file. Accordingly, it can be set that a user can photograph the moving image and capture the specific frame of the photographed moving image to display it together with the moving image.

As described above, since the captured still image file can be linked in the moving image file of the MPEG-4 standard, the moving image can be reproduced together with the linked still image on one screen. The user can select the capture still image included in a link target so as to independently reproduce the capture still image.

Hereinafter, methods of generating and reproducing a moving image with which another moving image file can be linked according to exemplary embodiments of the present general inventive concept is described below with reference to FIGS. 13 to 15C.

Figure 13:
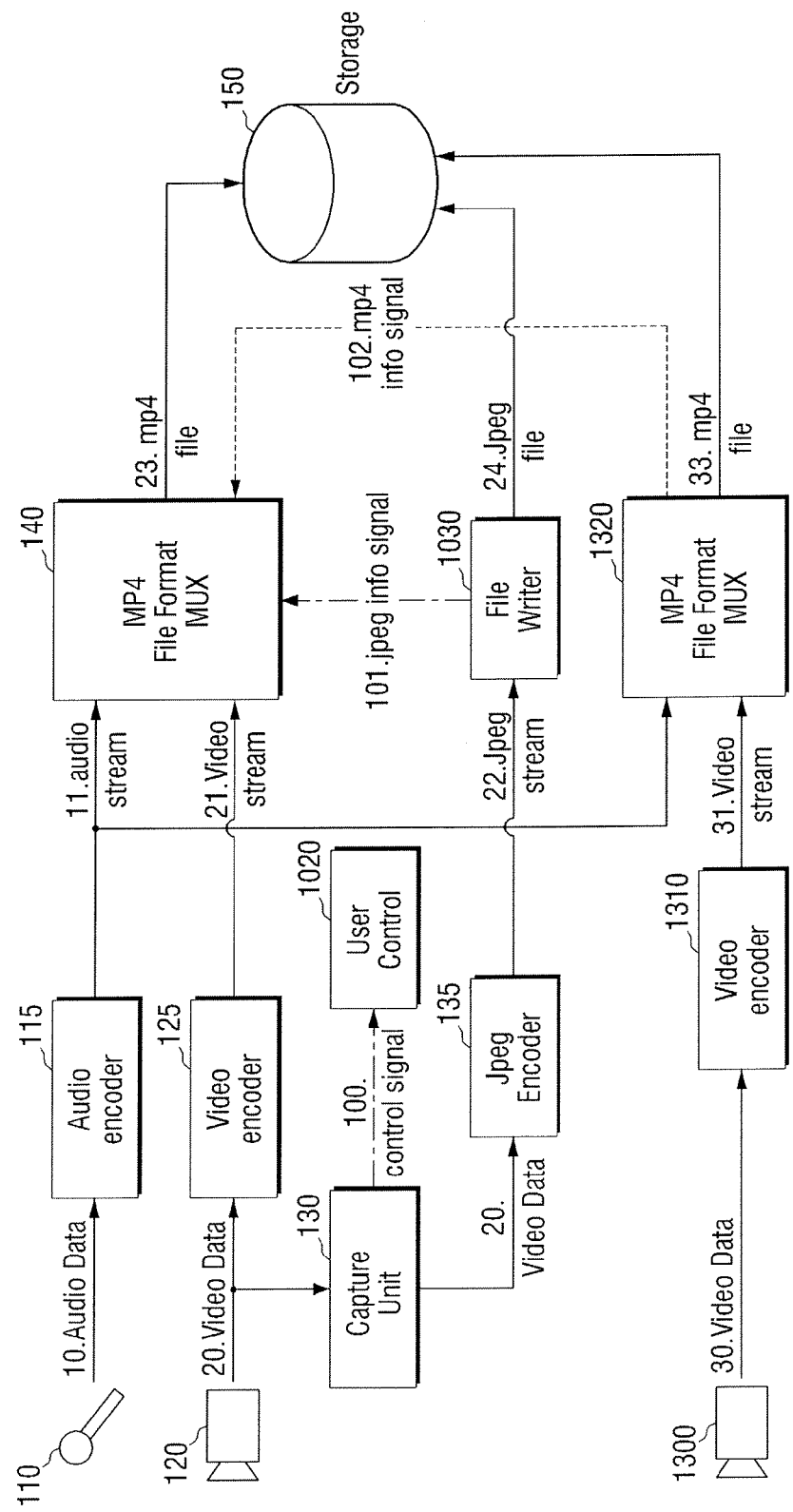
FIG. 13 is a view illustrating a camcorder according to exemplary embodiments of the present general inventive concept.

FIG. 13 is a view illustrating a detailed configuration of a camcorder according to exemplary embodiments of the present general inventive concept. FIG. 13 illustrates that the image storage apparatus 100 of FIG. 1 can be a camcorder. Accordingly, as illustrated in FIG. 13, the audio input unit 110 can be a microphone and a video input unit 120 can be a camera unit. The video input unit 120 may be any suitable apparatus to capture video and/or still images. For example, the video input unit 120 may include one or more lenses and an image sensor to convert received light into an electrical signal which may be used by the image storage apparatus 100. Description of parts of FIG. 13 which are the same as those of FIGS. 1 and 12 will be omitted and only other parts will be explained As illustrated in FIG. 13, a camcorder of the image storage apparatus 100 further includes an additional camera unit 1300, an additional video encoder 1310 and an additional MP4 file format MUX 1320 as compared with FIG. 12. Accordingly, the camcorder of the image storage apparatus 100 can photograph two moving images at once. The camera unit 1300 may include one or more lenses and an image sensor to capture a still image and/or a moving image, and the video encoder 1310 may be an integrated circuit, processor, an/or any suitable encoder to carry out the exemplary embodiments of the present general inventive concept as disclosed herein.

More specially, as illustrated in FIG. 13, the additional camera unit 1300 can photograph (e.g., capture) another moving image differently from the camera unit 110. The camera unit 1300 can transmit the photographed video data 30 to the video encoder 1310. The encoder 1310 can compress the video data 30 in video stream 31 and can transmit the video stream to the MP4 file format MUX 1320.

The MP4 file format MUX 1320 can generate an additional MP moving image file (MP4 file) 33 using an audio stream 11 and the video stream 31 and can store the MP4 moving image file 33 in a storage unit 150.

The MP4 file format MUX 1320 can transmit a moving image information signal (MP4 infor signal) 102 to a MP4 file format MUX 140. Herein, the moving image information signal 102 can be information provided to generate link information and can include a file name information of the additional moving image file 33, reproducing starting time point information, and reproducing time information.

Herein, the reproducing starting time point can be a time point where the additional moving image file 33 can be captured within a reproducing time of the moving image file being photographed, and the reproducing time can be a reproducing time of the additional moving image file 33.

The MP4 file format MUX 140 can generate an MP4 file moving image file (MP4 file) 23 using the audio stream 11 and video stream 21 and can store the MP4 moving image file 23 in the storage unit 150. The MP4 file format MUX 140 can generate link information to be included in the MP3 moving image file 23 by using the moving image information signal 102, and can store the MP4 moving image file 150 including the link information.

The link information may include a file name of the moving image file 33 photographed by the additional camera unit 1300, a reproducing starting time point, and reproducing time information. Herein, the reproducing starting time point can be a time point where the additional moving image file 33 is captured within a reproducing time of the moving file 23 being disposed, and the reproducing time is a reproducing time of the additional moving image file 33. More specifically, when the additional moving image is photographed at the time point where 10 minutes have elapsed after the moving image begins to be photographed, a name of the additional moving image file can be 'moving image 1.mp4'. When the additional moving image file has been photographed for total 2 minutes, the camcorder 100 can set the file name as 'moving image 1.mp4'. The reproducing starting time point can be set as 10 minutes, and the reproducing time can be set as 2 minutes in the link information of the photographed moving image.

The above-described method can be controlled so as to be performed by a controller of the camcorder of the image storage apparatus 100. More specifically, when the camera unit 110 is photographing the moving image (video data) 20, if the additional moving image (video data) 30 is photographed by the additional camera unit 1300, the controller can control the storage of the photographed additional moving image file 33 and can control the storage of the link information for the photographed additional moving image file 33 within the photographing moving image file 23.

Figure 14:
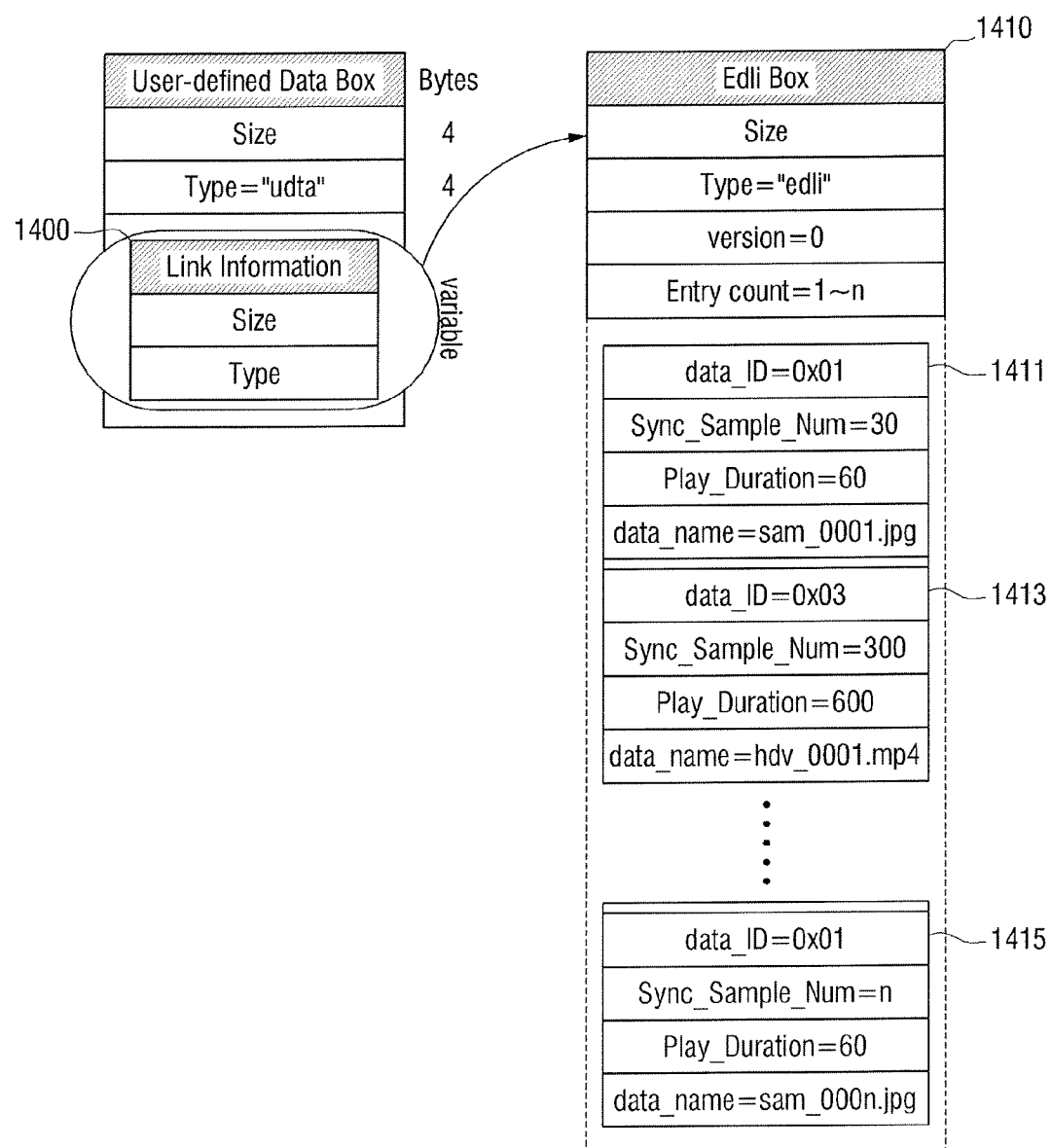
FIG. 14 is a view illustrating an example of link information for a still image file and a moving image file according to exemplary embodiments of the present general inventive concept.

FIG. 14 is a view illustrating an example of link information 1400 for a still image file and a moving image file according to exemplary embodiments of the present general inventive concept. FIG. 14 illustrates where a link information box 1410 is stored within a user-defined data file of a moving image file.

As illustrated in FIG. 14, n still images can be linked with a moving image within the link information box 1410. Accordingly, the Entry count can be 1 to n'.

This is similar to the link information box 1110 of FIG. 11. However, only the still image may be linked in FIG. 11, but the second moving image file link information 1413 can be included in the link information box 1410 in FIG. 14. For convenience of description, an original moving image file may be referred to as a first moving image file and a file which is a link target may be referred to as a second moving image file.

Referring to the second moving image file link information 1413, data_ID may be '0x03' so as to indicate a MP4 moving image, and Sync_Sample_Num may be '300' so as to indicate that the a reproducing starting time point of the second moving file can be a 300$^{th}$ frame of the first moving image file. In addition, Play_Duration can be '60' so as to indicate that a reproducing time of the second moving image is 60 seconds, and data_name can be 'hdv_0001.mp4' so as to indicate a file name of the second moving image file.

The first still image file link information 1411 to the nth still image link information 1415 can be included in a link information box 1410.

Thus, a plurality of still image files and a plurality of moving image files can be linked in the link information box 1410.

Figure 15A:
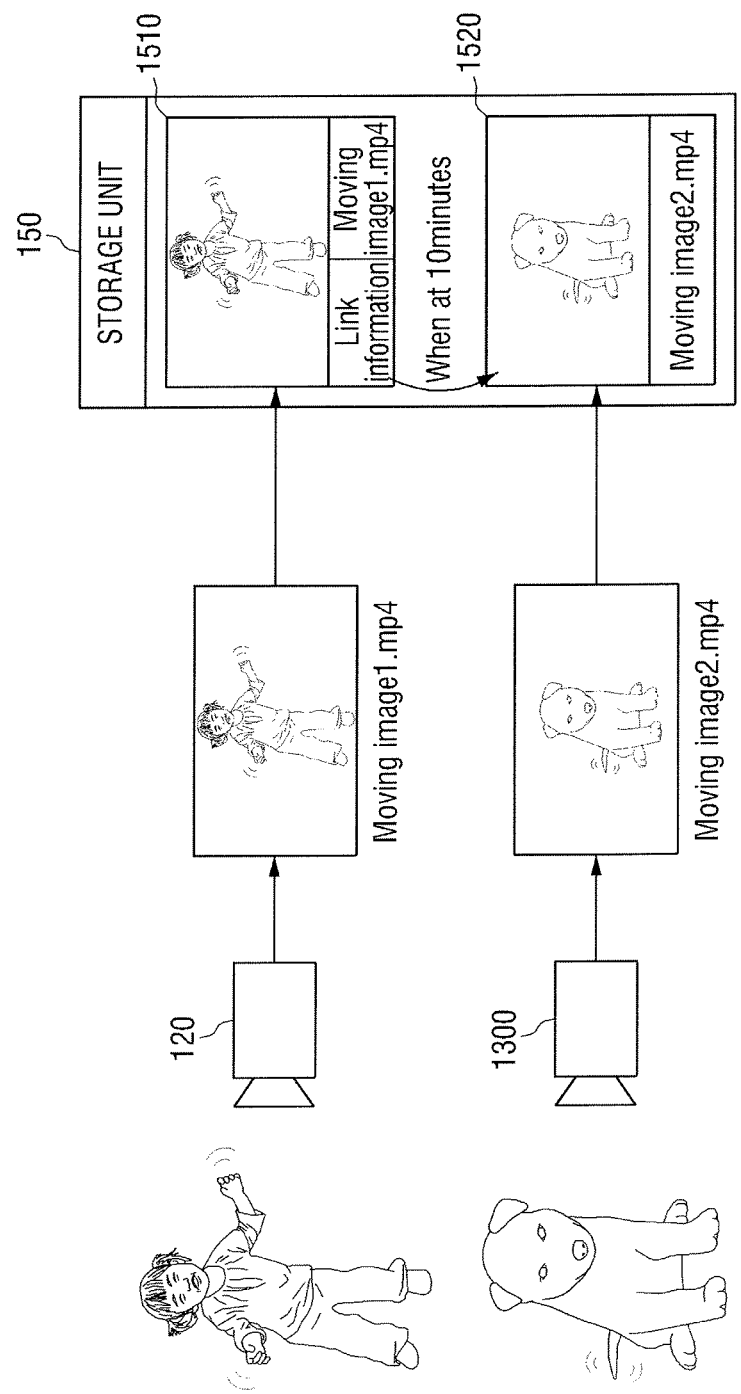
FIGS. 15A to 15C are views illustrating linking a moving image photographed by a camcorder with another moving image, storing the linked moving image file, and reproducing the photographed moving image according to exemplary embodiments of the present general inventive concept.
Figure 15B:
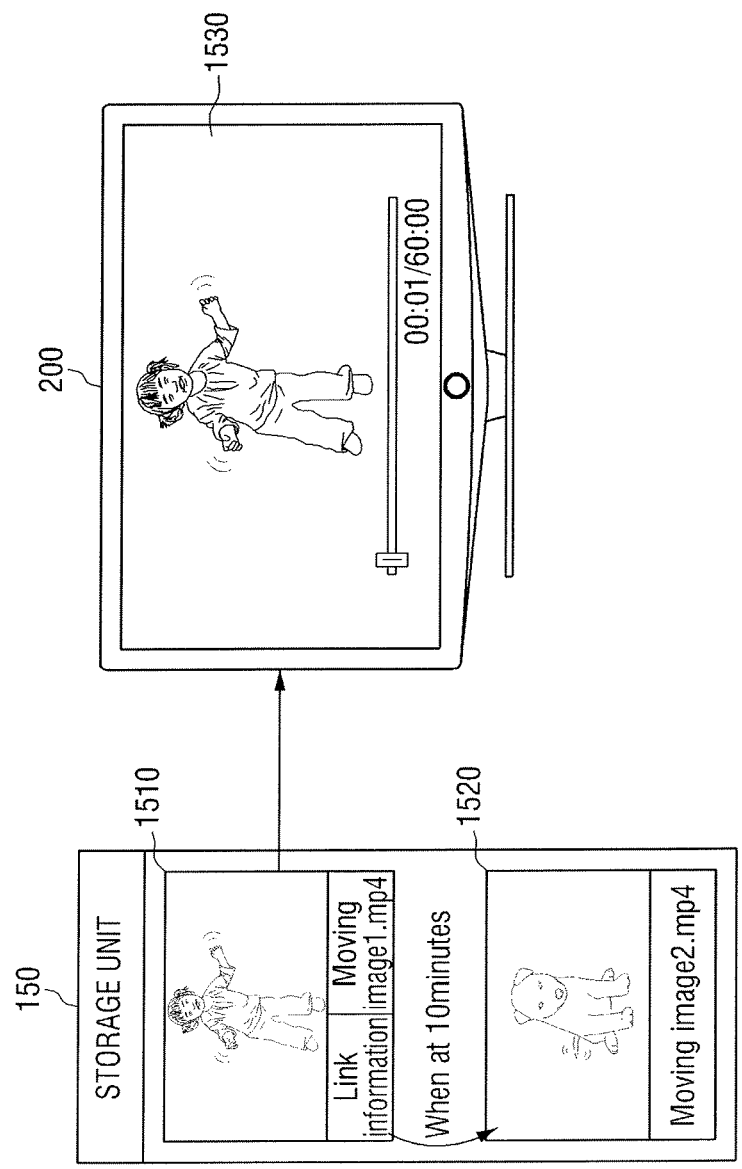
Figure 15C:
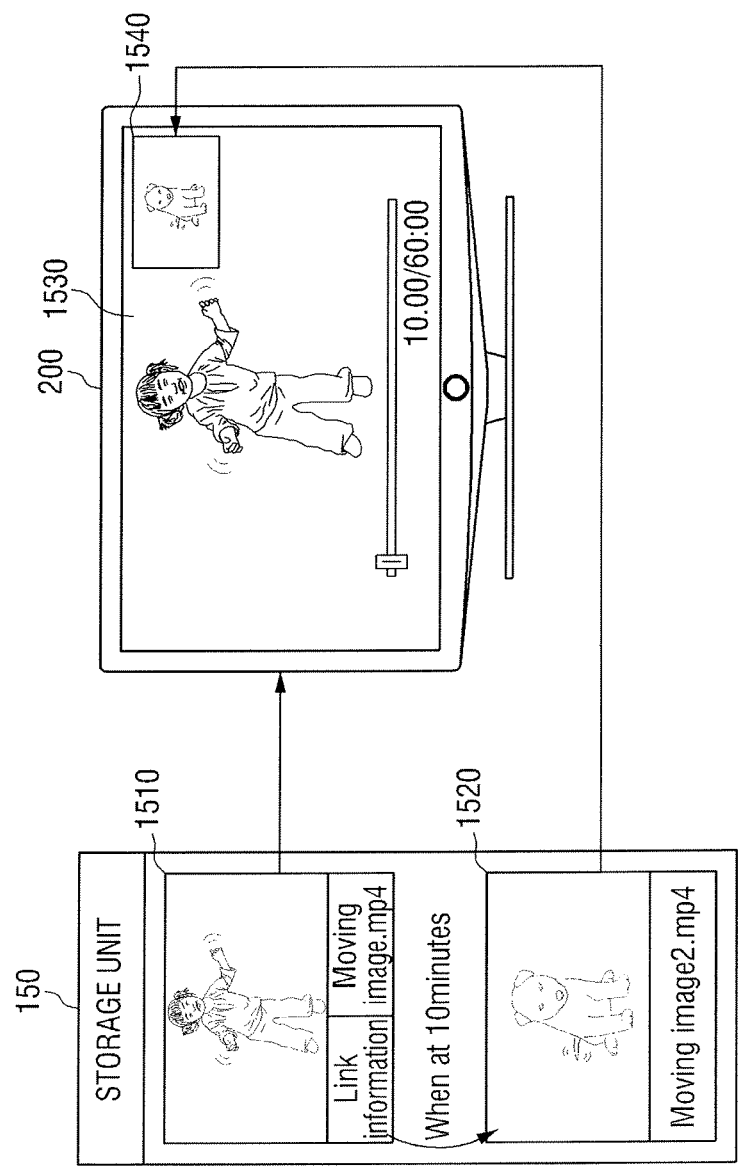

FIGS. 15A to 15C are views illustrating methods of linking a second moving image in a first moving image photographed by a camcorder of the image storage apparatus 100, storing the linked first moving image, and reproducing the first moving image.

FIG. 15A illustrates where the first moving image file (moving image 1.mp4) is photographed by a camera unit 120 of the camcorder of the image storage apparatus 100. The camcorder of the image storage apparatus 100 can capture the second moving image file (moving image 2.mp4) via an additional camera 1300 under the control of a user at the time point where 20 minutes have elapsed after the first moving image file begins to be photographed.

A first moving image file 1510 and a second moving image file 1520 can be separately stored in a storage unit 150, and the link information for the second moving image file can be included in the first moving image file 1510. More specifically, a reproducing time point of the second moving image file 1520 (when a first moving image reproducing time reaches at 10 minutes) can be set as a time point where the second moving image starts to be photographed.

FIG. 15B illustrates a screen on which the first moving image file 1510 photographed by the camcorder of the image storage apparatus 100 can be reproduced by the image reproducing apparatus 200. As illustrated in FIG. 15B, the image reproducing apparatus 200 can display a reproducing screen 1530 of the first moving image file 1510 on a screen. For example, a present reproducing time is 1 second.

FIG. 15C illustrates a screen on which the first moving image file 1510 photographed by the camcorder of the image storage apparatus 100 together with the second moving image file 1520 can be reproduced in the image reproducing apparatus 200.

In FIG. 15C, the image reproducing apparatus 200 can reproduce the first moving file 1510 at the time point where the reproducing time of the first moving image reaches 10 minutes. Referring to the link information of the first moving image file 1510, the second moving image file can be displayed at the time point where the reproducing time of the first moving image file 1510 reaches at 10 minutes.

Accordingly, the image reproducing apparatus 200 can display a reproducing screen of the first moving image file 1530 together with a reproducing screen 1540 of the second moving image in a PIP screen type.

The image reproducing apparatus 200 can display the second moving image file for a time set in the reproducing time information of the link information (that is, the reproducing time of the second moving image file) in a PIP type. If the reproducing time of the second moving image file 1520 elapses, the image reproducing apparatus 200 can display only the reproducing screen 1530 of the moving image file as illustrated in FIG. 15B.

Thus, the camcorder of the image storage apparatus 100 can photograph an additional moving image and link the photographed additional moving image file with the moving image file which is being displayed. Accordingly, user can photograph two moving images using the camcorder of the image storage apparatus 100. One moving image may be set to be displayed together with another moving image at a specific time point.

As described above, since the captured another moving image file is linked within the moving image file of the MPEG-4 standard, when a user reproduces the moving image file, the user can select that the moving image be displayed together with the linked another moving image file on the screen. The user can select the additional moving image file which is a link target so as to independently reproduce the additional moving image file.

Although the exemplary embodiments of the present general inventive concept illustrate a camcorder as a photographing apparatus, any apparatus capable of photographing a moving image file may be used according to the exemplary embodiments of the present general inventive concept. For example, the photographing apparatus may be a digital camera, a mobile phone with a camera, a portable computer, a personal digital assistant (PDA), and the like.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. An image reproducing apparatus, comprising:
 a display unit;
 a storage unit which stores a first content and a second content, wherein reproducing duration time information of the first content is recorded in a file of the second content; and
 a controller which reproduces the first content for a first period by referencing the reproducing duration time information recorded in the file of the second content while the second content is being reproduced,
 wherein the controller reproduces the first content and the second content for the first period, and reproduces only the second content for a second period that is different from the first period.

2. The apparatus as claimed in claim 1, wherein the first content comprises audio data, and the second content comprises a still image.

3. The apparatus as claimed in claim 1, wherein the first content comprises still image data, and the second content comprises video data and image data.

4. The apparatus as claimed in claim 1, wherein the second content is reproduced before, during, and after the first period that the first content is reproduced.

5. The apparatus as claimed in claim 1, wherein reproducing starting time point information of the first content is recorded in the file of the second content.

6. The apparatus as claimed in claim 1, wherein
the storage unit stores a third content and reproducing duration time information of the third content is recorded in the file of the second content, and
the controller reproduces the third content and the second content simultaneously for a third period based on the reproducing duration time information of the third content.

7. The apparatus as claimed in claim 1, wherein
the reproducing duration time information of the first content is recorded in the file of the second content at a time when the file of the second content is generated by the controller.

8. The apparatus as claimed in claim 1, wherein a name of the first content is recorded in the file of the second content and a reproducing starting time point information of the first content is recorded in the file of the second content.

9. The apparatus as claimed in claim 1, wherein the controller controls the display unit to display the reproducing duration time of the first content while the first content and the second content are being reproduced.

10. An image reproducing method, comprising:
storing a first content and a second content, wherein reproducing duration time information of the first content is recorded in a file of the second content;
controlling the first content to be reproduced for a first period by referencing the reproducing duration time information recorded in the file of the second content while the second content is being reproduced,
wherein the first content and the second content are reproduced for the first period, and only the second content is reproduced for a second period that is different from the first period.

11. The method as claimed in claim 10, wherein the first content comprises audio data, and the second content comprises a still image.

* * * * *

UNITED STATES PATENT AND TRADEMARK OFFICE
CERTIFICATE OF CORRECTION

PATENT NO. : 9,729,842 B2  
APPLICATION NO. : 14/755863  
DATED : August 8, 2017  
INVENTOR(S) : Jin-su Myung Page 1 of 1

It is certified that error appears in the above-identified patent and that said Letters Patent is hereby corrected as shown below:

On the Title Page

[54] (Title of Invention), Line 2:  
Delete "MEHOD" and insert -- METHOD --, therefore.

In the Specification

Column 1, Line 2:  
Delete "MEHOD" and insert -- METHOD --, therefore.

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*